US012558962B2

(12) United States Patent
Chang et al.

(10) Patent No.: US 12,558,962 B2
(45) Date of Patent: Feb. 24, 2026

(54) ELECTRONIC DEVICE AND VEHICLE SYSTEM

(71) Applicant: CARUX TECHNOLOGY PTE. LTD., Singapore (SG)

(72) Inventors: Yi-Cheng Chang, Tainan (TW); Nan-Chun Lin, Tainan (TW); Wen-Tai Chiang, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 305 days.

(21) Appl. No.: 18/300,554

(22) Filed: Apr. 14, 2023

(65) Prior Publication Data

US 2023/0373306 A1 Nov. 23, 2023

Related U.S. Application Data

(60) Provisional application No. 63/344,076, filed on May 20, 2022.

(30) Foreign Application Priority Data

Feb. 17, 2023 (CN) .......................... 202310183488.5

(51) Int. Cl.
B60K 35/81 (2024.01)
B60K 35/22 (2024.01)
(Continued)

(52) U.S. Cl.
CPC .............. B60K 35/81 (2024.01); B60K 35/22 (2024.01); B60K 35/90 (2024.01);
(Continued)

(58) Field of Classification Search
CPC ...... B60K 35/00; B60K 35/223; B60K 35/81; B60K 35/22; B60K 35/90; G09G 3/3406; G09G 3/006; G09G 2330/12; G09G 2310/08; G09G 2380/10; G09G 2330/026; G09G 3/36; G02F 1/133602;
(Continued)

(56) References Cited

U.S. PATENT DOCUMENTS 7,499,012 B2 * 3/2009 Yoshihara ............ G09G 3/3651
345/97
9,837,006 B2 12/2017 Hwang et al.
(Continued)

FOREIGN PATENT DOCUMENTS

CN 105741800 B 6/2018
CN 113851094 A * 12/2021 ........... G09G 3/3406

*Primary Examiner* — Douglas Wilson
(74) *Attorney, Agent, or Firm* — JCIPRNET

(57) ABSTRACT

A vehicle system includes a vehicle computer, a display unit, a backlight unit, a diagnosis unit and a microcontroller. The vehicle computer is configured to output a plurality of signals for controlling the vehicle system. The display unit is configured to receive a display signal output by the vehicle computer, so as to display a frame. The backlight unit is configured to provide a light source of the display unit. The diagnosis circuit unit is configured to diagnose the state of the backlight unit. The microcontroller is electrically connected to the diagnosis unit and the vehicle computer. When the backlight unit is diagnosed by the diagnosis unit, the display unit displays the frame at the same time.

20 Claims, 6 Drawing Sheets

(51) Int. Cl.
| | |
|---|---|
| B60K 35/90 | (2024.01) |
| G09G 3/00 | (2006.01) |
| G09G 3/34 | (2006.01) |
| G09G 3/36 | (2006.01) |
| *G02F 1/13357* | (2006.01) |
| *H05B 45/14* | (2020.01) |
| *H05B 45/56* | (2020.01) |
| *H05B 45/59* | (2022.01) |
| *H05B 47/24* | (2020.01) |
| *H05B 47/25* | (2020.01) |

(52) U.S. Cl.
CPC .. *G02F 1/133602* (2013.01); *G02F 1/133603* (2013.01); *G09G 3/006* (2013.01); *G09G 3/3406* (2013.01); *G09G 3/36* (2013.01); *G09G 2310/08* (2013.01); *G09G 2330/026* (2013.01); *G09G 2330/12* (2013.01); *G09G 2380/10* (2013.01); *H05B 45/14* (2020.01); *H05B 45/56* (2020.01); *H05B 45/59* (2022.01); *H05B 47/24* (2020.01); *H05B 47/25* (2020.01)

(58) Field of Classification Search
CPC ........................ G02F 1/133603; H04N 17/004; H05B 45/14; H05B 45/50; H05B 45/52; H05B 45/56; H05B 45/59; H05B 47/14; H05B 47/24; H05B 47/25
See application file for complete search history.

(56) References Cited

U.S. PATENT DOCUMENTS

| | | | | |
|---|---|---|---|---|
| 10,152,933 B2* | 12/2018 | Kuo | ..................... | G09G 3/3655 |
| 2016/0189581 A1* | 6/2016 | Hwang | .................. | G09G 3/006 |
| | | | | 345/691 |
| 2021/0049954 A1* | 2/2021 | Lee | ...................... | G09G 3/3406 |

* cited by examiner

ELECTRONIC DEVICE AND VEHICLE SYSTEM

CROSS REFERENCE TO RELATED APPLICATIONS

This application claims priority of U.S. Provisional Application No. 63/344,076, filed May 20, 2022, and China Patent Application No. 202310183488.5, filed on Feb. 17, 2023, the entirety of which is incorporated by reference herein.

BACKGROUND OF THE DISCLOSURE

Field of the Disclosure

The disclosure relates to an electronic device, and in particular, to an electronic device and a vehicle system.

Description of the Related Art

Before a display of a conventional display device is turned on, the display device may diagnoses the backlight of the display, so as to determine whether the backlight is normal. However, in the above diagnosis period, the backlight may flicker, causing the display to flicker as well, which may affect user experience. Therefore, a new design for a circuit structure is needed to solve the problem described above.

BRIEF SUMMARY OF THE DISCLOSURE

An embodiment of the disclosure provides an electronic device, which includes a vehicle computer, a display unit, a backlight unit, a diagnosis unit and a microcontroller. The vehicle computer is configured to output a plurality of signals for controlling the vehicle system. The display unit is configured to receive a display signal output by the vehicle computer, so as to display a frame. The backlight unit is configured to provide a light source of the display unit. The diagnosis unit is configured to diagnose the state of the backlight unit. The microcontroller is electrically connected to the diagnosis unit and the vehicle computer. When the backlight unit is diagnosed by the diagnosis unit, the display unit displays the frame at the same time.

An embodiment of the disclosure provides an electronic device, which includes a display unit, a backlight unit and a diagnosis unit. The backlight unit is configured to provide a light source of the display unit. The diagnosis unit is configured to diagnose the state of the backlight unit. When the backlight unit is diagnosed by the diagnosis unit, the display unit displays the frame at the same time.

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Figure 1:
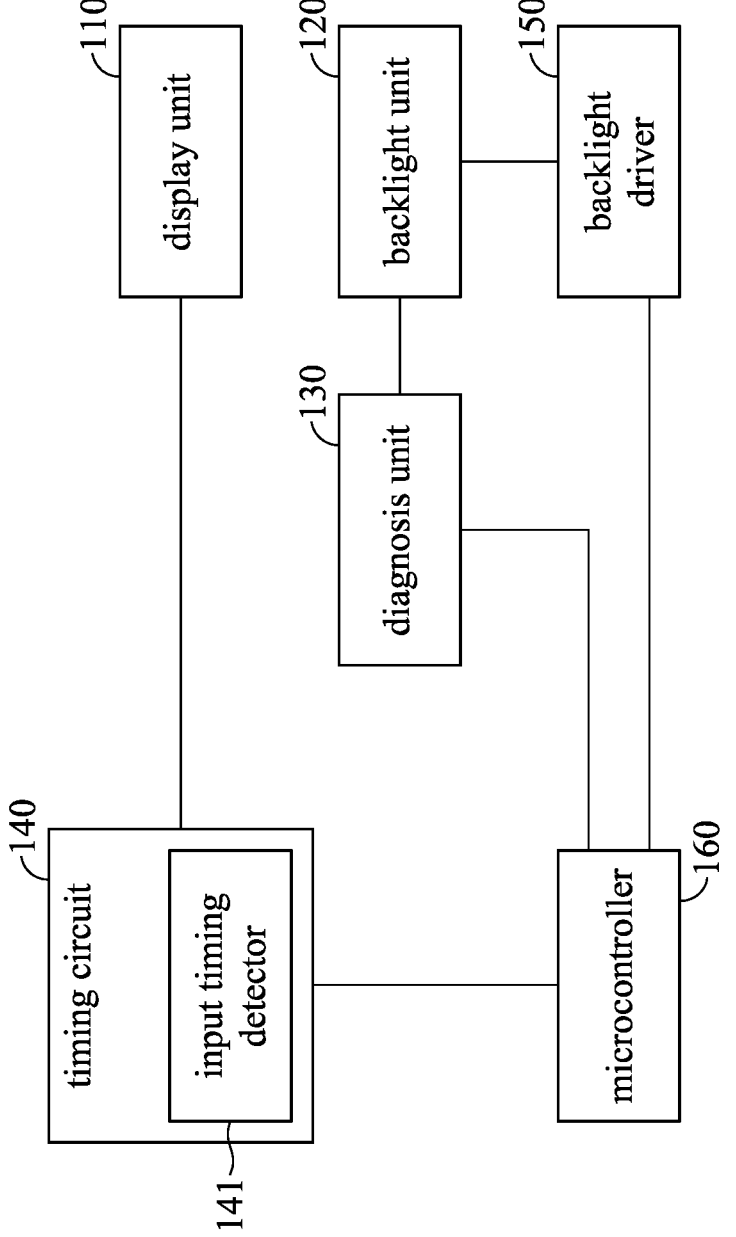
FIG. 1 is a schematic view of an electronic device according to an embodiment of the disclosure.

In order to make objects, features and advantages of the disclosure more obvious and easily understood, the embodiments are described below, and the detailed description is made in conjunction with the drawings. In order to help the reader to understand the drawings, the multiple drawings in the disclosure may depict a part of the entire device, and the specific components in the drawing are not drawn to scale.

The specification of the disclosure provides various embodiments to illustrate the technical features of the various embodiments of the disclosure. The configuration, quantity, and size of each component in the embodiments are for illustrative purposes, and are not intended to limit the disclosure. In addition, if the reference number of a component in the embodiments and the drawings appears repeatedly, it is for the purpose of simplifying the description, and does not mean to imply a relationship between different embodiments.

Furthermore, use of ordinal terms such as "first", "second", etc., in the specification and the claims to describe a claim element does not by itself connote and represent the claim element having any previous ordinal term, and does not represent the order of one claim element over another or the order of the manufacturing method, either. The ordinal terms are used as labels to distinguish one claim element having a certain name from another element having the same name.

In the disclosure, the technical features of the various embodiments may be replaced or combined with each other to complete other embodiments without being mutually exclusive.

In some embodiments of the disclosure, unless specifically defined, the term "coupled" may include any direct and indirect means of electrical connection.

In the text, the terms "substantially" or "approximately" usually means within 10%, or within 5%, or within 3%, or within 2%, or within 1%, or within 0.5% of a given value or range.

The "including" mentioned in the entire specification and claims is an open term, so it should be interpreted as "including or comprising but not limited to".

Furthermore, "connected" or "coupled" herein includes any direct and indirect connection means. Therefore, an element or layer is referred to as being "connected to" or "coupled to" another element or layer, the element or layer can be directly on, connected or coupled to another element or layer or intervening elements or layers may be present. When an element is referred to as being "directly connected to" or "directly coupled to" another element or layer, there are no intervening elements or layers present. If the text describes that a first device on a circuit is coupled to a second device, it indicates that the first device may be directly electrically connected to the second device. When the first device is directly electrically connected to the second device, the first device and the second device are connected through conductive lines or passive elements (such as resistors, capacitors, etc.), and no other electronic elements are connected between the first device and the second device. "Electrically connected" or "coupled" described in the disclosure may refer to "directly connected" or "indirectly connected". In the case of "directly connected", the terminals of the elements on two circuits are directly connected or connected to each other through a conductive line segment. In the case of "indirectly connected", there are a switch, a diode, a capacitor, an inductor, a resistor, another suitable element, or a combination of the above elements between the terminals of the elements on the two circuits, but the disclosure is not limited thereto.

In an embodiment, the electronic device may include a display device, a backlight device, an antenna device, a sensing device, a splicing device or a therapeutic diagnosis device, but the disclosure is not limited thereto. The electronic device may be a bendable or flexible electronic device. The display device may be a non-self-luminous type display device or a self-luminous type display device. The antenna device may be a liquid-crystal type antenna device or a non-liquid-crystal type antenna device, and the sensing device may be a sensing device that senses capacitance, light, heat or ultrasound, but the disclosure is not limited thereto. The electronic component may include a passive component and an active component, such as a capacitor, a resistor, an inductor, a diode, a transistor, etc. The diode may include a light-emitting diode or a photodiode. The light-emitting diode may include, for example, an organic light-emitting diode (OLED), a mini LED, a micro LED or a quantum dot LED, but the disclosure is not limited thereto. The splicing device may be, for example, a display splicing device or an antenna splicing device, but the disclosure is not limited thereto. It should be noted that the electronic device may be any arrangement and combination of the above devices, but the disclosure is not limited thereto. Hereinafter, the display device will be used as an electronic device to illustrate to the content of the disclosure, but the disclosure is not limited thereto.

FIG. 1 is a schematic view of an electronic device according to an embodiment of the disclosure. Please refer to FIG. 1. The electronic device 100 may at least include a display unit 110, a backlight unit 120 and a diagnosis unit 130.

The display unit 110 may be configured to display a frame. In the embodiment, the display unit 110 may be a liquid crystal display (LCD), but the disclosure is not limited thereto. The backlight unit 120 may be configured to provide a light source of the display unit 110. In addition, the backlight unit 120 may be disposed adjacent to the display unit 110. In some embodiments, the backlight unit 120 may be disposed around or at the side of the display unit 110, but the disclosure is not limited thereto. In some embodiments, the backlight unit 120 may be disposed below the display unit 110 in a vertical direction, but the disclosure is not limited thereto. In the embodiment, the backlight unit 120 may be an active backlight module, but the disclosure is not limited thereto.

The diagnosis unit 130 may be configured to diagnose the state of the backlight unit 120. That is, the diagnosis unit 130 may diagnose the backlight unit 120, so as to determine whether the state of the backlight unit 120 is normal. In addition, in the embodiment, when the backlight unit 120 is diagnosed by the diagnosis unit 130, the display unit 110 may display the frame at the same time, as shown in FIG. 2.

Figure 2:
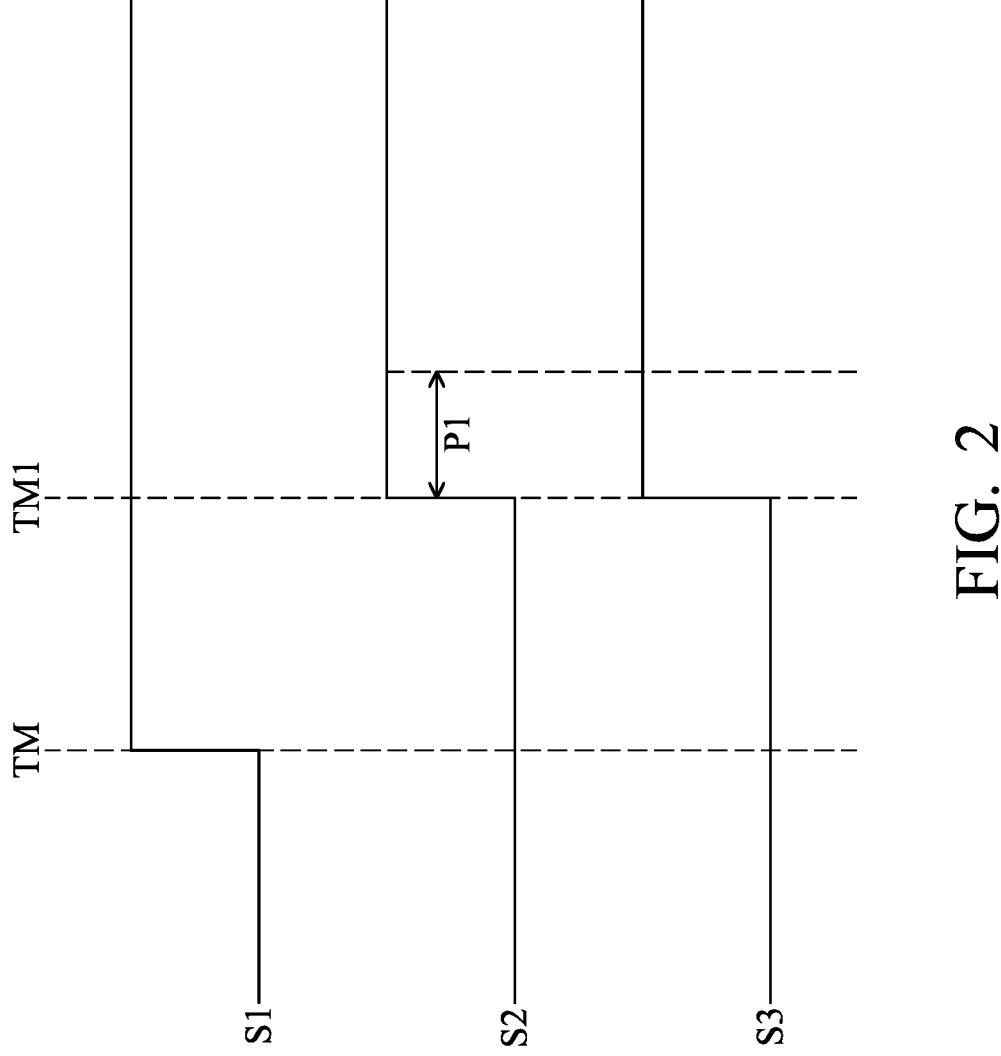
FIG. 2 is a schematic view of an operation timing of an electronic device according to an embodiment of the disclosure.

In FIG. 2, the reference number "S1" indicates a power-on timing of the electronic device 100, the reference number "S2" indicates a turning-on timing of the backlight unit 120, the reference number "S3" indicates display timing of the display unit 110, the number timing "TM" and the reference number "TM1" indicates a time, and the reference number "P1" indicates a diagnosis period. It can be seen form FIG. 2 that at time TM, the electronic device 100 is powered on, and it indicates that the electronic device 100 is electrically connected to a system power source. Then, at time TM1, the backlight unit 120 is turned on and is diagnosed by the diagnosis unit 130 in the diagnosis period P1, and the display unit 110 simultaneously starts displaying the frame. In addition, the diagnosis period P1 may at least partially overlap the turning-on period of the backlight unit 120 and the display period of the display unit 110. Therefore, the display unit 110 simultaneously display the frame in the diagnosis period P1, the flicker phenomenon generated by the backlight unit 120 in the diagnosis period P1 may be effectively reduced, thereby optimize the experience of the user.

In some embodiments, the electronic device 100 may further include a timing circuit 140. The timing circuit 140 may be electrically connected to the display unit 110 and the backlight unit 120. The timing circuit 140 may be configured to provide a first signal to the display unit 110 and to provide a second signal to the backlight unit 120, such that the display unit 110 and the backlight unit 120 may be simultaneously turned on. In the embodiment, the timing circuit 140 may include a timing controller (T-CON), but the disclosure is not limited thereto.

Furthermore, the timing circuit 140 may receive the display signal, and generate the first signal and a timing signal corresponding to the display signal according to the display signal, and the timing circuit 140 may generate the second signal according to the timing signal corresponding to the display signal and a predetermined timing signal. In addition, the first signal may be a timing control signal, and the display unit 110 may display the corresponding frame according to the first signal (i.e., the timing control signal), but the disclosure is not limited thereto. The second signal may be an activation indication flag, and the backlight unit 120 may be activated according to the second signal (i.e., the activation indication flag) and generate the corresponding light.

In some embodiments, the electronic device 100 further include a backlight driver 150 and a microcontroller 160. The backlight driver 150 may be electrically connected to the backlight unit 120. The microcontroller 160 may be electrically connected to the timing circuit 140 and the backlight driver 150. The microcontroller 160 may receive the second signal, and provides a third signal to the backlight driver 150, so as to turn on the backlight unit 120.

That is, when the microcontroller 160 receives the second signal having, for example, a high logic level (for example, the activation indication flag is "1"), the microcontroller 160 may generate the third signal having, for example, a high logic level to the backlight driver 150, so as to indicate the backlight driver 150 to generate the corresponding driving signal. Then, when the backlight driver 150 receives the third signal having the high logic level, the backlight driver 150 may generate the driving signal having, for example, a high logic level to the backlight unit 120, so as to turn on the backlight unit 120, such that the backlight unit 120 generates the corresponding light.

When the microcontroller 160 receives the second signal having, for example, a low high logic level (for example, the activation indication flag is "0"), the microcontroller 160 may generate the third signal having, for example, a low logic level to the backlight driver 150 so as to indicate the backlight driver 150 to generate the corresponding driving signal or not to generate the driving signal. Then, when the backlight driver 150 receives the third signal having the low high logic level, the backlight driver 150 may generate the driving signal having, for example, a low high logic level or may not generate the driving signal, such that backlight unit 120 may not be turned on and may not generate the corresponding light.

In some embodiment, the timing circuit 140 may include an input timing detector 141. The input timing detector 141 is configured to receive the timing signal corresponding to the display signal and the predetermined timing signal, and provides a corresponding comparison signal, wherein the comparison signal is the second signal. In addition, the above predetermined timing signal may be preset in a register (not shown) of the timing circuit 140, but the disclosure is not limited thereto.

Figure 3:
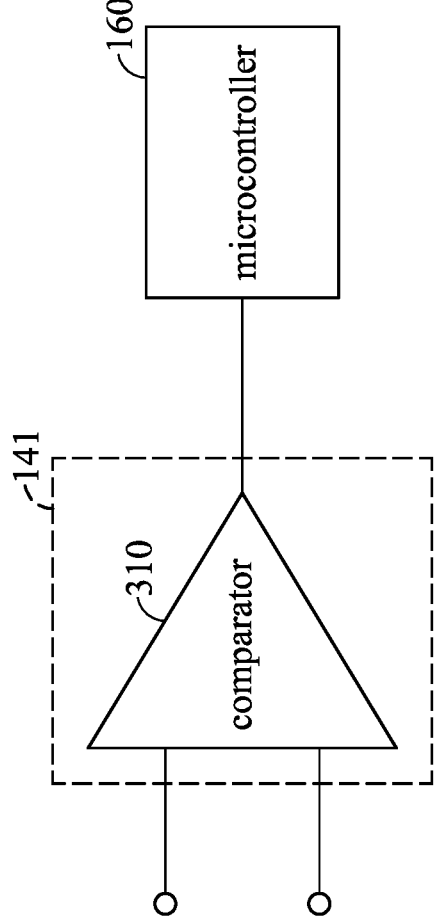
FIG. 3 is a schematic view of an input timing detector and a microcontroller according to an embodiment of the disclosure.

Furthermore, the input timing detector 141 may include a comparator 310, as shown in FIG. 3. The comparator 310 may include a first input terminal, a second input terminal and an output terminal. The first input terminal of the comparator 310 may receive the timing signal corresponding to the display signal. The second input terminal of the comparator 310 may receive the predetermined timing signal. The output terminal of the comparator 310 may be electrically connected to the microcontroller 160, and provide the corresponding comparison signal (the second signal) to the microcontroller 160.

For example, when the comparator 310 determines that the timing signal corresponding to the display signal is consistent with the predetermined timing signal, the comparator 310 may provide a comparison signal having, for example, a high logic level (such as the second signal having the high logic level (i.e., the activation indication flag is "1")) to the microcontroller 160. Then, the microcontroller 160 may provide the third signal having, for example, a high logic level to the backlight driver 150 according to the comparison signal having the high logic level. Afterward, the backlight driver 150 may generate the driving signal having, for example, a high logic level to the backlight unit 120 according to the third signal having the high logic level, so as to turn on the backlight unit 120, such that the backlight unit 120 generates the corresponding light.

When the comparator 310 determines that the timing signal corresponding to the display signal is not consistent with the predetermined timing signal, the comparator 310 may provide a comparison signal having, for example, a low logic level (such as the second signal having the low high logic level (i.e., the activation indication flag is "0")) to the microcontroller 160. Then, the microcontroller 160 may provide the third signal having, for example, a low logic level to the backlight driver 150 according to the comparison signal having the low logic level. Afterward, the backlight driver 150 may generate the driving signal having, for example, a low high logic level or may not generate the driving signal according to the third signal having the low logic level, such that the backlight unit 120 may not be turned on and may not generate the corresponding light. In some embodiments, the third signal may be a signal generated before the backlight unit 120 is driven, but the disclosure is not limited thereto.

Figure 4:
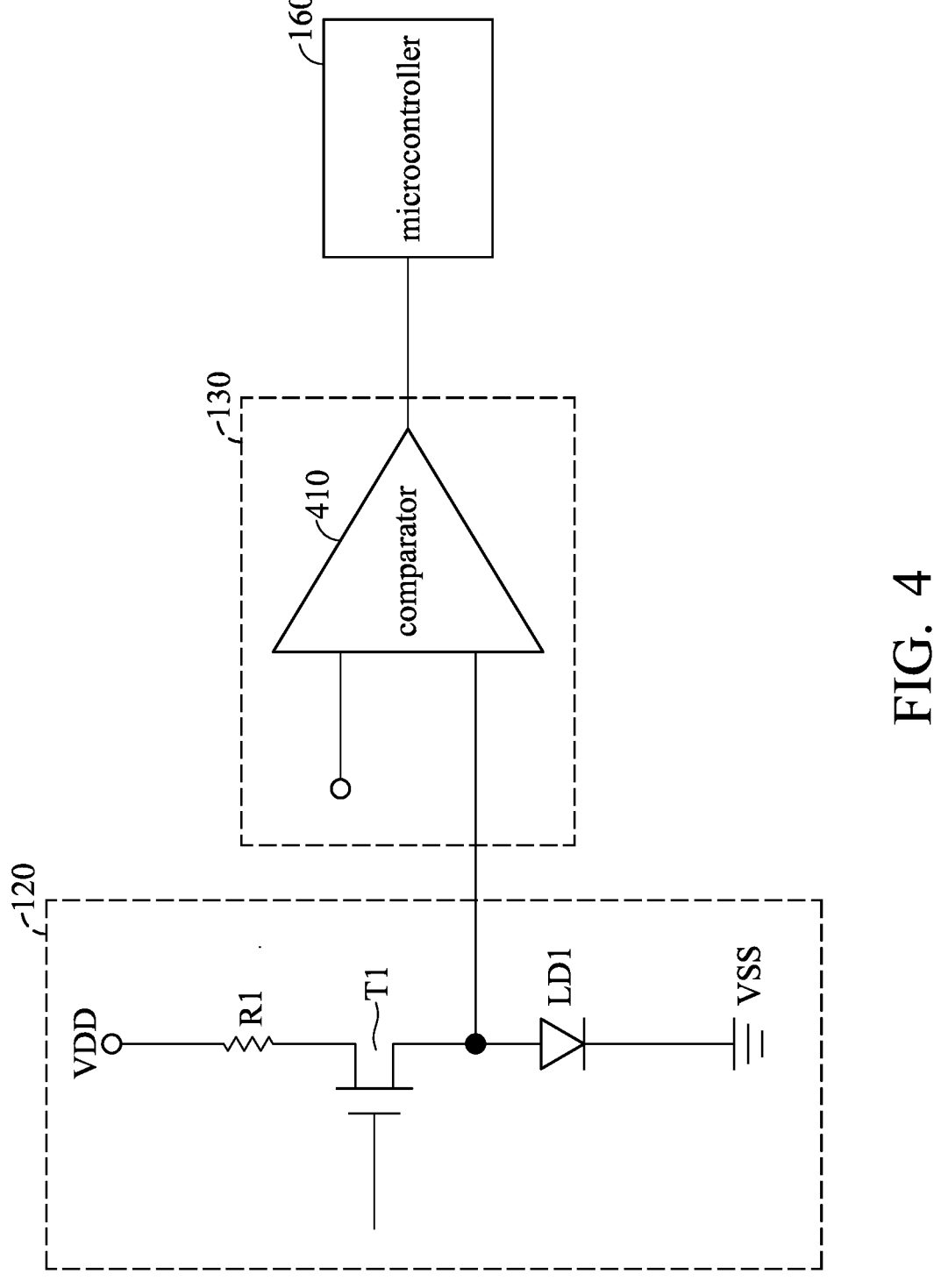
FIG. 4 is a schematic view of a display unit, a diagnosis circuit unit and a microcontroller according to an embodiment of the disclosure.

In the embodiments, the backlight unit 120 may include a transistor T1 and a light-emitting element LD1, as shown in FIG. 4. The transistor T1 may be configured to control the light-emitting element LD1, i.e., the transistor T1 may control whether the light-emitting element LD1 emits light. In the embodiment, the transistor T1 may include a first terminal, a second terminal and a control terminal. The first terminal of the transistor T1 may be electrically connected to a voltage VDD. The control terminal of the transistor T1 may be electrically connected to the backlight driver 150 and receive the driving signal.

The light-emitting element LD1 may include a first terminal and a second terminal. The first terminal of the light-emitting element LD1 may be electrically connected to the second terminal of the transistor T1 and the diagnosis unit 130. The second terminal of the light-emitting element LD1 may be electrically connected to a reference voltage VSS (such as a ground voltage).

In the embodiment, the transistor T1 may be a thin film transistor (TFT), but the disclosure is not limited thereto. In addition, the transistor T1 may be an N-type transistor, wherein the first terminal of the transistor T1 is, for example, a drain terminal of the N-type transistor, the second terminal of the transistor T1 is, for example, a source terminal of the N-type transistor, and the control terminal of the transistor T1 is, for example, a gate terminal of the N-type transistor, but the disclosure is not limited thereto. In other embodiments, the transistor T1 may also be a P-type transistor or another suitable transistor.

In addition, the light-emitting element LD1 may be a light-emitting diode, wherein the first terminal of the light-emitting element LD1 is, for example an anode terminal of the light-emitting diode, and the second terminal of the light-emitting element LD1 is, for example, a cathode terminal of the light-emitting diode, but the disclosure is not limited thereto. In some embodiments, the backlight unit 120 may also include a resistor R1, as shown in FIG. 4. The resistor R1 may include a first terminal and a second terminal. The first terminal of the resistor R1 may be electrically connected to the first terminal of the transistor T1, and the second terminal of the resistor R1 may be electrically connected to the voltage VDD. That is, the first terminal of the transistor T1 may be electrically connected to the voltage VDD through the resistor R1.

In the embodiment, the diagnosis unit 130 may diagnose whether the voltage of the light-emitting element LD1 is normal. Furthermore, the diagnosis unit 130 may include a comparator 410, as shown in FIG. 4. The comparator 410 may include a first input terminal, a second input terminal and an output terminal. The first terminal of the comparator 410 may be electrically connected to the backlight unit 120 (such as the first terminal of the light-emitting element LD1), and receives the working voltage of the backlight unit 120 (such as the voltage of the light-emitting element LD1). The second terminal of the comparator 410 receives a predetermined voltage range. The output terminal of the comparator 410 may be electrically connected to the microcontroller 160, and provides a comparison signal to the microcontroller 160. That is, the comparator 410 may receive the predetermined voltage range and the working voltage of the backlight unit 120, and provide the comparison signal to the microcontroller 160. In the embodiment, the predetermined voltage range may include at least one of a voltage upper limit and a voltage lower limit, but the disclosure is not limited thereto. In addition, the predetermined voltage range may be preset in the register of the diagnosis unit 130, but the disclosure is not limited thereto.

When the comparator 410 determines that the working voltage of the backlight unit 120 (such as the voltage of the light-emitting unit LD1) is within the predetermined voltage range, it indicates that the working voltage of the backlight unit 120 (such as the voltage of the light-emitting element LD1) is, for example, less than the voltage upper limit or the working voltage of the backlight unit 120 (such as the voltage of the light-emitting element LD1) is, for example, greater than the voltage lower limit. Accordingly, the comparator 410 may generate a comparison signal having, for example, a low logic level, so as to indicate that the state of the backlight unit 120 diagnosed by the diagnosis unit 130 is a normal state. Then, the comparator 410 may provide the comparison signal having the low logic level to the microcontroller 160. Afterward, the microcontroller 160 may not generate an abnormal indication signal according to the comparison signal having the low logic level, and it indicates that the backlight unit 120 does not occur the abnormal phenomenon.

When the comparator 410 determines that the working voltage of the backlight unit 120 (such as the voltage of the light-emitting unit LD1) is not within the predetermined voltage range, it indicates that the working voltage of the backlight unit 120 (such as the voltage of the light-emitting element LD1) is, for example, greater than the voltage upper limit or the working voltage of the backlight unit 120 (such as the voltage of the light-emitting element LD1) is, for example, less than the voltage lower limit. Accordingly, the comparator 410 may generate a comparison signal having, for example, a high logic level, so as to indicate that the state of the backlight unit 120 diagnosed by the diagnosis unit 130 is an abnormal state. Then, the comparator 410 may provide the comparison signal having the high logic level to the microcontroller 160. Afterward, the microcontroller 160 may generate an abnormal indication signal according to the comparison signal having the high logic level, and it indicates that the backlight unit 120 occurs the abnormal phenomenon.

In FIG. 4, the number of transistor T1, the number of light-emitting element LD1, the number of resistor R1 and the number of comparator 410 are one, but the disclosure is not limited thereto. In other embodiments, the number of transistor T1, the number of light-emitting element LD1, the number of resistor R1 and the number of comparator 410 may be two or more than two.

In some embodiments, the number of light-emitting element LD1 may be the same as the number of comparator 410. For example, when the number of light-emitting element LD1 is one, the number of the comparator 410 is one. When the number of light-emitting element LD1 is two, the number of comparator 410 is two. The relationship between other number of light-emitting element LD1 and other number of comparator 410 may follow similar rules. That is, the light-emitting element LD1 corresponds to the comparator 410 in one-to-one. Therefore, the diagnosis unit 130 may diagnose the voltage of each of the light-emitting elements LD1 of the backlight unit 120, so as to generate a comparison signal corresponding to the voltage of each of the light-emitting elements LD1. Then, the microcontroller 160 may receive the comparison signal corresponding to the voltage of each of the light-emitting element LD1, so as to know the state of each of the light-emitting element LD1 of the backlight unit 120 is a normal state or an abnormal state.

Figure 5:
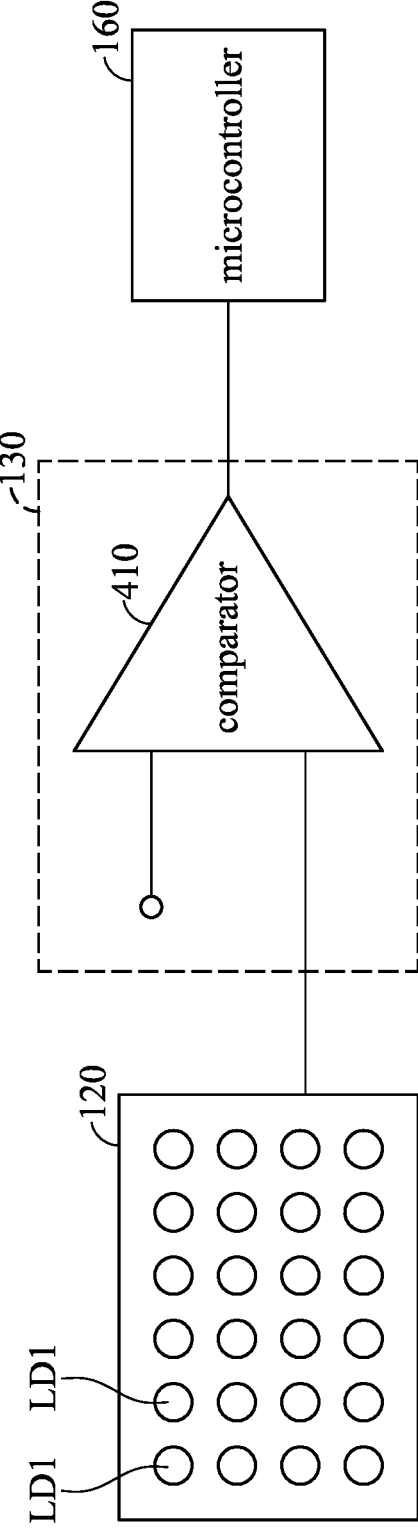
FIG. 5 is a schematic view of a display unit, a diagnosis circuit unit and a microcontroller according to another embodiment of the disclosure.

In addition, in some embodiments, the number of light-emitting element LD1 may be different from the number of comparator 410, as shown in FIG. 5. For the convenience of illustration, FIG. 5 shows that the backlight unit 120 includes a plurality of light-emitting elements LD1, and does not show the transistor T1 and the resistor R1. However, in fact, the backlight unit 120 in FIG. 5 still includes a plurality of transistors T1 and a plurality of resistors R1. The connection relationship of the light-emitting elements LD1, the transistors T1 and the resistors R1 may refer to FIG. 4, and the description thereof is not repeated herein.

For example, the backlight unit 120 may include a plurality of light-emitting elements LD1, and the diagnosis unit 130 may include one comparator 410. In addition, the comparator 410 may receive the working voltage of the backlight unit 120, so as to diagnose the state of the backlight unit 120. In the embodiment, the working voltage of the backlight unit 120 is, for example, a total voltage or an average voltage of the light-emitting elements LD1, but the disclosure is not limited thereto. Therefore, the diagnosis unit 130 may diagnose the working voltage of the backlight unit 120, so as to generate a comparison signal corresponding to the working voltage of the backlight unit 120. Then, the microcontroller 160 may receive the comparison signal corresponding to the working voltage of the backlight unit 120, so as to know the state of the backlight unit 120 is a normal state or an abnormal state.

In FIG. 1, the diagnosis unit 130 may be an independent chip, and is externally connected to the circuit board of the backlight unit 120. In addition, the circuit board is located, for example, in the non-light-emitting area or the peripheral area of the backlight unit 120, and the circuit board 120 may be a printed circuit board (PCB) or a flexible printed circuit board (FPCB), but the disclosure is not limited thereto. That is, the diagnosis unit 130 may be disposed separately from the microcontroller 160, but the disclosure is not limited thereto. In some embodiments, the diagnosis unit 130 may also be integrated in the microcontroller 160, and the same effect may also be achieved.

Figure 6:
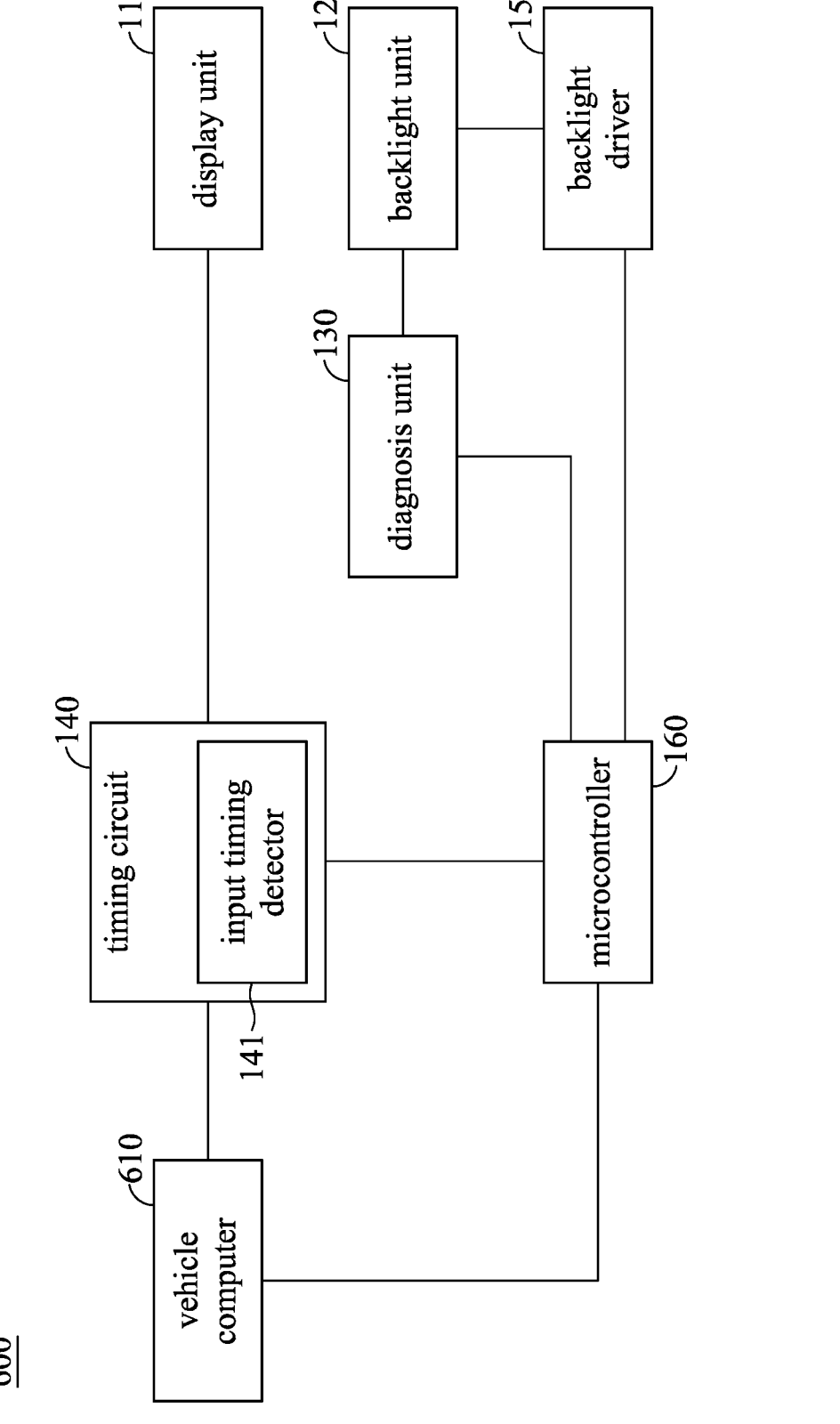
FIG. 6 is a schematic view of a vehicle system according to an embodiment of the disclosure.

FIG. 6 is a schematic view of a vehicle system according to an embodiment of the disclosure. Please refer to FIG. 6. The vehicle system 600 may at least include a vehicle computer 610, a display unit 110, a backlight unit 120, a diagnosis unit 130, a timing circuit 140, a backlight driver 150 and a microcontroller 160. In the embodiment, the display unit 110, the backlight unit 120, the diagnosis unit 130, the timing circuit 140, the backlight driver 150 and the microcontroller 160 in FIG. 7 are the same as or similar to the display unit 110, the backlight unit 120, the diagnosis unit 130, the timing circuit 140, the backlight driver 150 and the microcontroller 160 in FIG. 1. Accordingly, the display unit 110, the backlight unit 120, the diagnosis unit 130, the timing circuit 140, the backlight driver 150 and the microcontroller 160 in FIG. 7 may refer to the description of the embodiment of FIG. 1, and the description thereof is not repeated herein.

The vehicle computer 610 may be electrically connected to the timing circuit 140 and the microcontroller 160. The vehicle computer 610 may be configured to output a plurality of signals for controlling the vehicle system 600. In the embodiment, the vehicle computer 610 may include a vehicle control unit (VCU), a system on a chip (SOC) or another suitable controller, but the disclosure is not limited thereto.

The display unit 110 may be configured to receive a display signal output by the vehicle computer 610, so as to display a frame. In some embodiments, the display unit 110 may receive the display signal output by the vehicle computer 610 through the timing circuit 140, so as to display the frame. That is, the vehicle computer 610 may output the display signal to the timing circuit 140. Then, the timing circuit 140 may generate the first signal according to the display signal output by the vehicle computer 610, and provide the first signal to the display unit 110, such that the display unit 110 displays the corresponding frame.

In some embodiments, when the vehicle computer 610 is powered on, it indicates that the vehicle computer 610 is electrically connected to the system power source, and then the vehicle computer 610 may generate a power-on indication signal to the microcontroller 160, such that the microcontroller 160 knows that the vehicle computer 610 has been powered on. That is, the vehicle computer 610 may be powered on at the time TM as shown in FIG. 2, and after the vehicle computer 610 is powered on, the vehicle computer 610 may provide the power-on indication signal to the microcontroller 160.

In summary, according to the electronic device and the vehicle system disclosed by the embodiments of the disclosure, when the backlight unit is diagnosed by the diagnosis unit, the display unit displays the frame at the same time. Therefore, the flicker phenomenon generated by the backlight unit in the diagnosis period may be effectively reduced, or the experience of the user may be increased.

While the disclosure has been described by way of examples and in terms of the preferred embodiments, it should be understood that the disclosure is not limited to the disclosed embodiments. On the contrary, it is intended to cover various modifications, combinations, and similar arrangements (as would be apparent to those skilled in the art). Therefore, the scope of the appended claims should be accorded the broadest interpretation to encompass all such modifications, combinations, and similar arrangements.

What is claimed is:

1. A vehicle system, comprising:
a vehicle computer, configured to output a plurality of signals for controlling the vehicle system;
a display unit, configured to receive a display signal output by the vehicle computer, so as to display a frame;
a backlight unit, configured to provide a light source of the display unit;
a diagnosis unit, configured to diagnose a state of the backlight unit during a diagnosis period; and
a microcontroller, electrically connected to the diagnosis unit and the vehicle computer;
wherein the display unit displays the frame during the diagnosis period;
wherein a startup time of the diagnosis period of the diagnosis unit, a startup time of a turning-on period of the backlight unit and a startup time of a display period of the display unit are aligned.

2. The vehicle system as claimed in claim 1, wherein the backlight unit comprises at least one transistor and at least one light-emitting element, and the at least one transistor is configured to control the at least one light-emitting element.

3. The vehicle system as claimed in claim 2, wherein the diagnosis unit diagnoses whether a voltage of the at least one light-emitting element is normal.

4. The vehicle system as claimed in claim 1, further comprising:
a timing circuit, configured to provide a first signal to the display unit and to provide a second signal to the backlight unit, such that the display unit and the backlight unit are simultaneously turned on.

5. The vehicle system as claimed in claim 4, wherein the timing circuit comprises:
an input timing detector, wherein the input timing detector comprises a first comparator, the first comparator receives a timing signal corresponding to a display signal and a predetermined timing signal, and provides a first comparison signal, wherein the first comparison signal is the second signal.

6. The vehicle system as claimed in claim 4, further comprising:
a backlight driver, electrically connected to the backlight unit; and
a microcontroller, electrically connected to the timing circuit and the backlight driver, wherein the microcontroller receives the second signal, and provides a third signal to the backlight driver, so as to turn on the backlight unit.

7. The vehicle system as claimed in claim 1, wherein the diagnosis unit comprises:
a second comparator, wherein the second comparator receives a predetermined voltage range and a working voltage of the backlight unit, and provides a second comparison signal to a microcontroller.

8. The vehicle system as claimed in claim 7, wherein when the working voltage is within the predetermined voltage range, the state of the backlight unit diagnosed by the diagnosis unit is a normal state.

9. The vehicle system as claimed in claim 8, wherein when the working voltage is not within the predetermined voltage range, the state of the backlight unit diagnosed by the diagnosis unit is an abnormal state.

10. The vehicle system as claimed in claim 1, wherein the diagnosis period of the diagnosis unit at least partially overlap the turning-on period of the backlight unit and the display period of the display unit.

11. An electronic device, comprising:
a display unit;
a backlight unit, configured to provide a light source of the display unit; and
a diagnosis unit, configured to diagnose a state of the backlight unit during a diagnosis period;
wherein the display unit displays the frame during the diagnosis period;
wherein a startup time of the diagnosis period of the diagnosis unit, a startup time of a turning-on period of the backlight unit and a startup time of a display period of the display unit are aligned.

12. The electronic device as claimed in claim 11, wherein the backlight unit comprises at least one transistor and at least one light-emitting element, and the at least one transistor is configured to control the at least one light-emitting element.

13. The electronic device as claimed in claim 12, wherein the diagnosis unit diagnoses whether a voltage of the at least one light-emitting element is normal.

14. The electronic device as claimed in claim 11, further comprising:
a timing circuit, configured to provide a first signal to the display unit and to provide a second signal to the backlight unit, so that the display unit and the backlight unit are simultaneously turned on.

15. The electronic device as claimed in claim 14, wherein the timing circuit comprises:
an input timing detector, wherein the input timing detector comprises a first comparator, the first comparator receives a timing signal corresponding to a display signal and a predetermined timing signal, and provides a first comparison signal, wherein the first comparison signal is the second signal.

16. The electronic device as claimed in claim 14, further comprising:
a backlight driver, electrically connected to the backlight unit; and
a microcontroller, electrically connected to the timing circuit and the backlight driver, wherein the microcontroller receives the second signal, and provides a third signal to the backlight driver, so as to turn on the backlight unit.

17. The electronic device as claimed in claim 11, wherein the diagnosis unit comprises:

a second comparator, wherein the second comparator receives a predetermined voltage range and a working voltage of the backlight unit, and provides a second comparison signal to a microcontroller.

18. The electronic device as claimed in claim 17, wherein when the working voltage is within the predetermined voltage range, the state of the backlight unit diagnosed by the diagnosis unit is a normal state.

19. The electronic device as claimed in claim 18, wherein when the working voltage is not within the predetermined voltage range, the state of the backlight unit diagnosed by the diagnosis unit is an abnormal state.

20. The electronic device as claimed in claim 11, wherein the diagnosis period of the diagnosis unit at least partially overlap the turning-on period of the backlight unit and the display period of the display unit.

\* \* \* \* \*